United States Patent
Donderici

(10) Patent No.: US 10,359,536 B2
(45) Date of Patent: Jul. 23, 2019

(54) SURFACE CALIBRATION OF A WELLBORE RESISTIVITY LOGGING TOOL

(71) Applicant: Halliburton Energy Services, Inc., Houston, TX (US)

(72) Inventor: Burkay Donderici, Houston, TX (US)

(73) Assignee: Halliburton Energy Services Inc., Houston, TX (US)

( * ) Notice: Subject to any disclaimer, the term of this patent is extended or adjusted under 35 U.S.C. 154(b) by 0 days.

(21) Appl. No.: 14/907,921

(22) PCT Filed: Sep. 10, 2013

(86) PCT No.: PCT/US2013/059066
§ 371 (c)(1),
(2) Date: Jan. 27, 2016

(87) PCT Pub. No.: WO2015/038102
PCT Pub. Date: Mar. 19, 2015

(65) Prior Publication Data
US 2016/0170068 A1    Jun. 16, 2016

(51) Int. Cl.
*G01V 3/28* (2006.01)
*G01V 13/00* (2006.01)

(52) U.S. Cl.
CPC ............ *G01V 3/28* (2013.01); *G01V 13/00* (2013.01)

(58) Field of Classification Search
CPC combination set(s) only.
See application file for complete search history.

(56) References Cited

U.S. PATENT DOCUMENTS

| | | |
|---|---|---|
| 4,876,511 A | 10/1989 | Clark |
| 6,597,993 B2 | 7/2003 | Strickland et al. |
| 7,027,922 B2 | 4/2006 | Bespalov et al. |
| 7,282,704 B2 | 10/2007 | Guo |
| 7,414,391 B2 | 8/2008 | Homan et al. |
| 7,769,572 B2 | 8/2010 | Srnka et al. |
| 8,173,954 B2 | 5/2012 | Duraj |
| 8,258,790 B2 | 9/2012 | Folberth et al. |
| 2007/0229081 A1* | 10/2007 | Frey ............... G01V 13/00 324/323 |
| 2008/0197851 A9 | 8/2008 | Forgang et al. |
| 2008/0315883 A1 | 12/2008 | Chemali et al. |

FOREIGN PATENT DOCUMENTS

| | | |
|---|---|---|
| CN | 101069105 A | 11/2007 |
| RU | 2401442 C2 | 10/2010 |
| WO | WO 2013/123293 A1 | 8/2013 |

OTHER PUBLICATIONS

International Preliminary Report on Patentability, dated May 6, 2015, PCT/US2013/059066, 5 pages, IPEA/US.
International Search Report and the Written Opinion of the International Searching Authority, or the Declaration, dated Feb. 19, 2014, PCT/US2013/059066, 12 pages, ISA/US.
(Continued)

*Primary Examiner* — Minh Q Phan
(74) *Attorney, Agent, or Firm* — Haynes and Boone, LLP

(57) ABSTRACT

Surface calibration of a resistivity logging tool is accomplished using a variety of methods in which separate external loop transmitters and receivers are utilized for calibration.

19 Claims, 14 Drawing Sheets

(56) References Cited

OTHER PUBLICATIONS

Netto, et al. "Landing a Well Using a Deep Electromagnetic Directional LWD Tool. Can We Spare a Pilot Well?", SPWLA 53$^{rd}$ Annual Logging Symposium, Jun. 16-20, 2012.
Office Action for Chinese Patent Appli8cation No. 201380078686.X dated Nov. 16, 2017, 17 pages.
Office Action for Russian Patent Application No. 2016103309 dated May 29, 2017, 4 pages.
Search Report for Russian Patent Application No. 2016103309 dated May 29, 2017, 2 pages.

\* cited by examiner

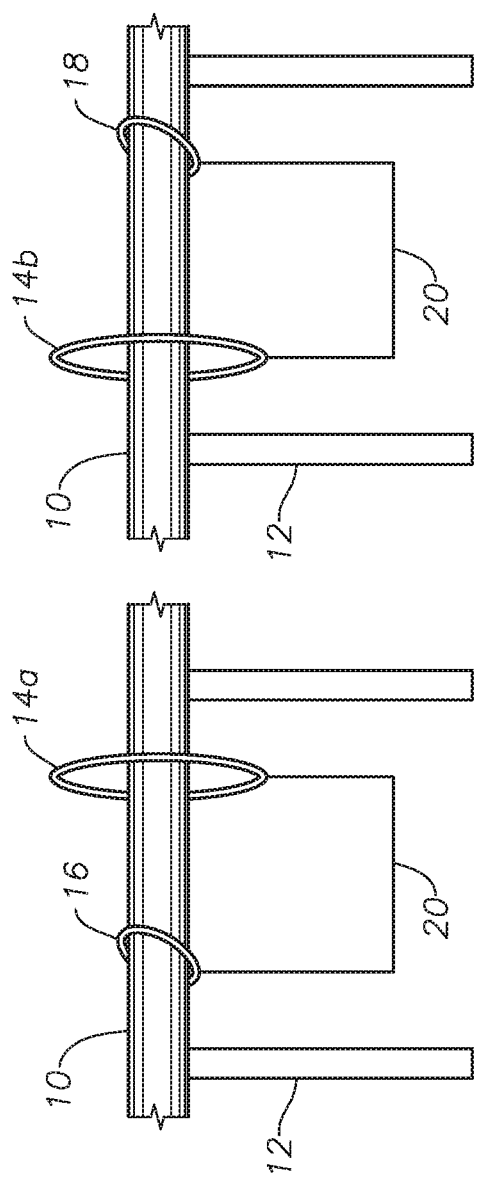

SURFACE CALIBRATION OF A WELLBORE RESISTIVITY LOGGING TOOL

The present application is a U.S. National Stage patent application of International Patent Application No. PCT/US2013/059066, filed on Sep. 10, 2013, the benefit of which is claimed and the disclosure of which is incorporated herein by reference in its entirety.

FIELD OF THE DISCLOSURE

The present disclosure relates generally to calibration techniques for wellbore logging tools and, more specifically, to a surface calibration method for a resistivity logging tool.

BACKGROUND

Among all logging tools deployed in the wellbore, resistivity tools provide the largest depth of detection. As a result, they have been extensively used for detecting formation layer boundaries in applications such as landing or well placement. Moreover, such logging tools are utilized to acquire various other characteristics of earth formations traversed by the wellbore and data relating to the size and configuration of the wellbore itself. The collection of information relating to downhole conditions, commonly referred to as "logging," can be performed by several methods including wireline logging and "logging while drilling" ("LWD").

The depth of detection provided by the logging tool is directly proportional to the distance between the transmitter and the receiver. As a result, most of the deep reading tools have very large distance between them. For example, some deep resistivity reading tools can be as long as 50-100 feet, and they operate at frequencies lower than 8 KHz to compensate for the geometrically increasing attenuation at larger transmitter receiver separations. In contrast, the standard, shallower, tools have a range of about 20 feet and they are optimized for placement of wells in reservoirs within about 10 feet from the top or bottom boundary of the reservoir rock.

The required distances between the transmitters and receivers along deep reading tools create problems in calibration since most of the conventional calibration methods (air hang, test tank, or oven, for example) require a certain stand-off from any nearby objects that might interfere with the calibration measurement signals. As a result, it is impractical to apply these conventional calibration techniques to a deep reading resistivity tool since the tool's sensitive volume is too large and, thus, it is not feasible to have facilities big enough to fully contain the tools.

Accordingly, there is a need in the art for a practical technique in which to calibrate a deep reading resistivity logging tool.

BRIEF DESCRIPTION OF THE DRAWINGS

FIG. 1 illustrates a logging tool situated on a stand which is calibrated according to certain illustrative methodologies of the present disclosure;

DESCRIPTION OF ILLUSTRATIVE EMBODIMENTS

Figure 2A:
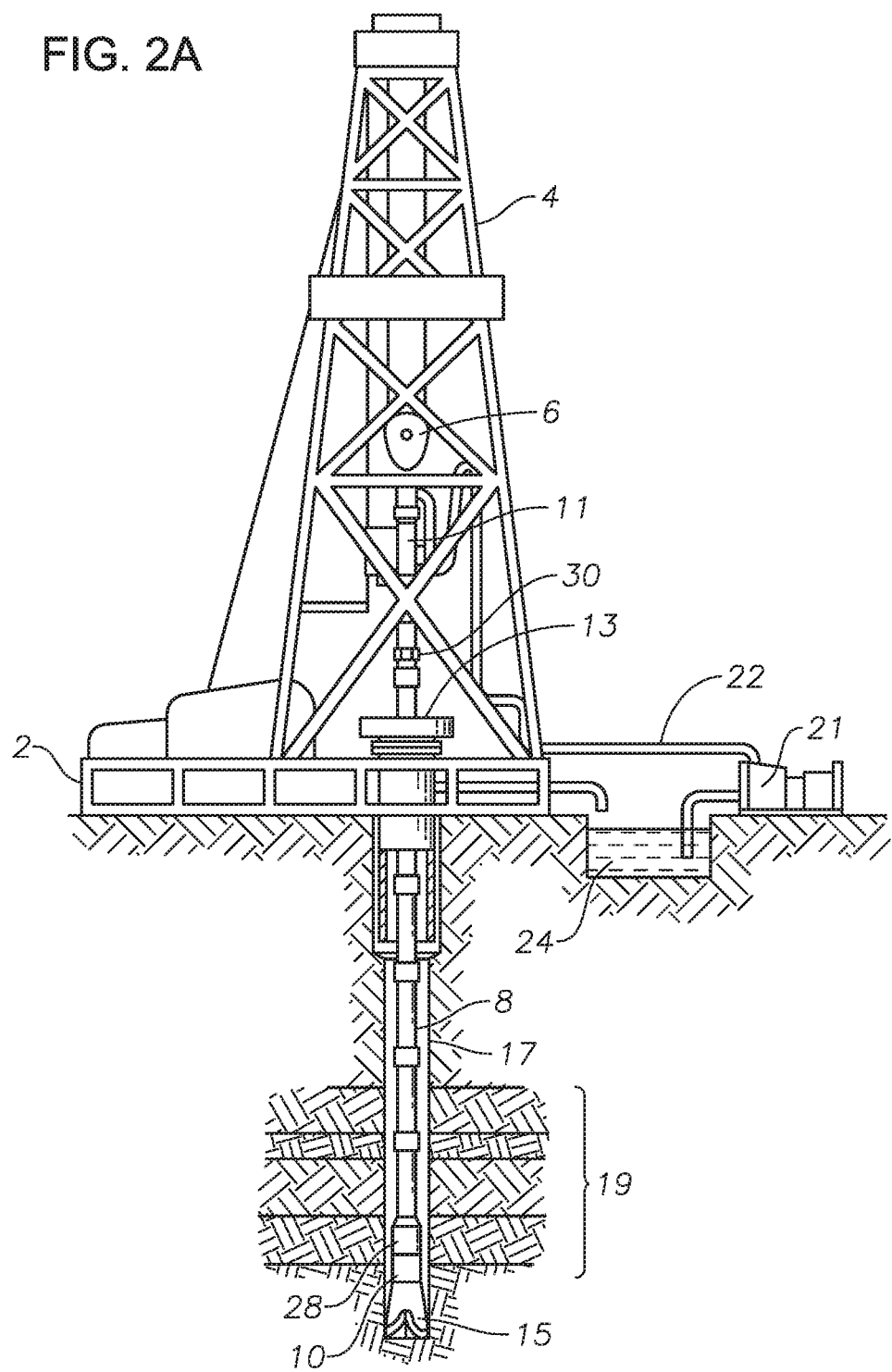
FIGS. 2A and 2B illustrate a resistivity logging tool, utilized in an LWD and wireline application, respectively, according certain illustrative embodiments of the present disclosure.

Illustrative embodiments and related methodologies of the present disclosure are described below as they might be employed in a surface calibration methodology for use with wellbore resistivity logging tools. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

FIG. 1 illustrates a logging tool situated on a stand which is calibrated according to an exemplary methodology of the present disclosure. As described herein, illustrative embodiments of the present disclosure describe various methodologies for surface calibration of resistivity logging tools. A logging tool 10 is first positioned on a stand 12. Alternatively, logging tool 10 may be suspended or otherwise secured at a surface location. Loops 14 (i.e., transmitter loop 14a or receiver loop 14b) are positioned adjacent to the tool receiver 16 and transmitter 18, respectively. For example, loops 14 may be a distance of 10 to 20 feet in some embodiments. In certain embodiments, separate external transmitter and receiver loops are used for calibration. Such an embodiment will be especially useful for a modular tool, as shown in FIG. 1, where the transmitter and receiver of a deep reading tool are on physically separate pieces of a collar. However, the present disclosure is also applicable to unified logging tools. Nevertheless, surface calibration of the transmitter and receiver can be conducted separately, which requires less physical space and clearance for the measurements.

As further shown in FIG. 1, in order to calibrate transmitter 18, external calibrated receiver loop 14b is placed in the vicinity of transmitter 18 to thereby record signals emanating from transmitter 18. The measured signals are then compared to simulated signals and, as a result of the comparison, calibration coefficients for transmitter 18 are determined. Calibration of tool receiver 16 is accomplished in like manner through use of loop transmitter 14a. In certain embodiments, synchronization (to calibrate phase) between tool transmitter 18/receiver 16 and their respective loop receiver 14b/transmitter 14a may be accomplished by placing a synchronization line 20 between them. Line 20 may be wired or wireless.

Figure 2B:
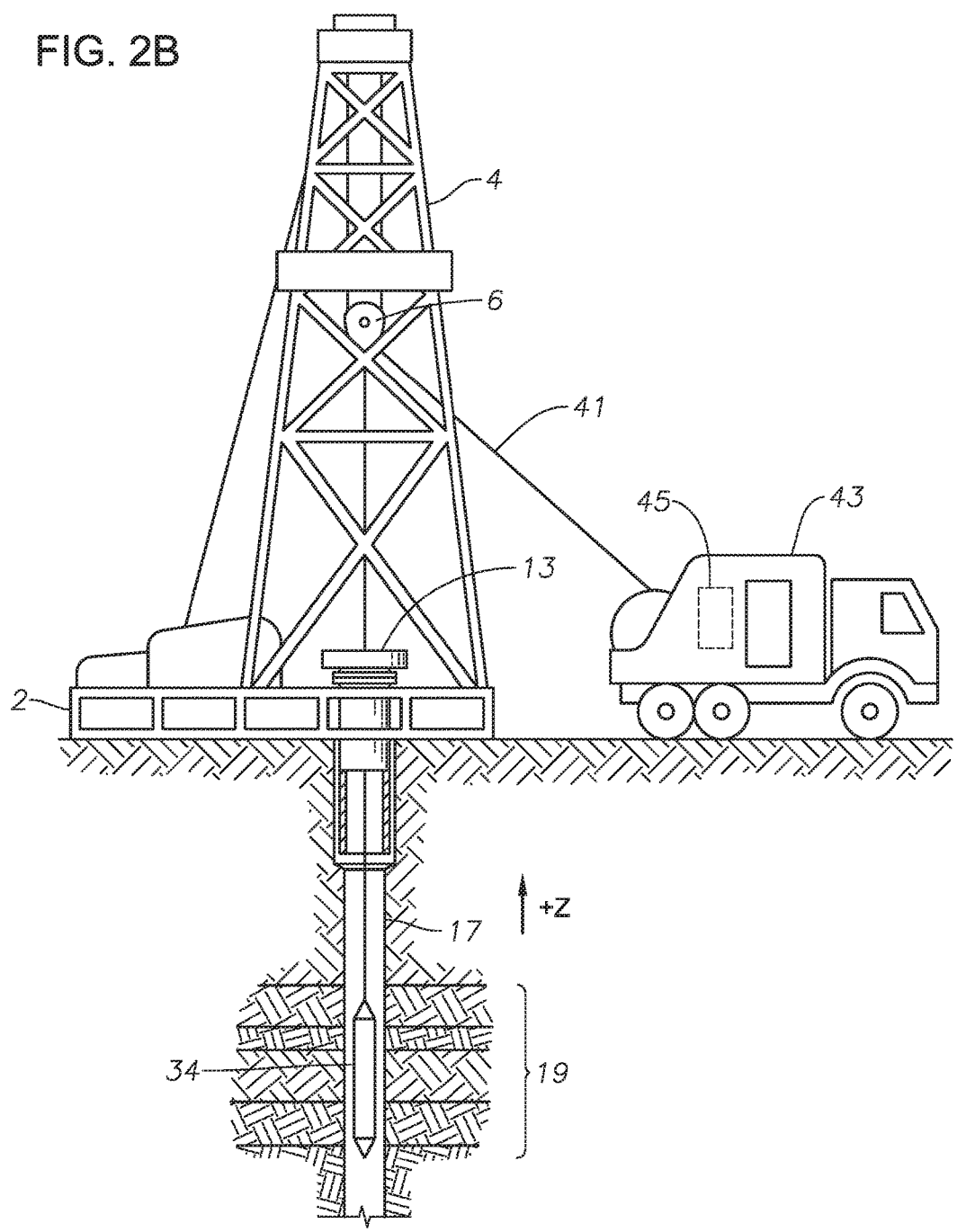

Thereafter, the tool is deployed downhole and formation measurements are taken as shown in FIGS. 2A and 2B. FIGS. 2A and 2B illustrate a resistivity logging tool, utilized in an LWD and wireline application, respectively, according to certain illustrative embodiments of the present disclosure. Once deployed, the calibration coefficients for tool transmitter 18 and receiver 16 calculated at the surface are applied to real signals obtained downhole to thereby calibrate the measurements. Thereafter, the calibrated measurement signal is inverted to generate desired petrophysical characteristics of the borehole and surrounding geological formation (i.e., formation parameters) related to electrical or geological properties of the formation such as, for example, layer resistivities, distances or direction to layer boundaries, 2D shape of arbitrary layer boundaries, or 3D distribution of formation resistivities. In an alternative mode of application of calibration, the calibration may be applied to the model data in inversion instead. Accordingly, wellbore operations may be conducted based upon the formation parameters such as, for example, drilling, well placement, landing or geosteering operations.

FIG. 2A illustrates a drilling platform 2 equipped with a derrick 4 that supports a hoist 6 for raising and lowering a drill string 8. Hoist 6 suspends a top drive 11 suitable for rotating drill string 8 and lowering it through well head 13. Connected to the lower end of drill string 8 is a drill bit 15. As drill bit 15 rotates, it creates a wellbore 17 that passes through various formations 19. A pump 21 circulates drilling fluid through a supply pipe 22 to top drive 11, down through the interior of drill string 8, through orifices in drill bit 15, back to the surface via the annulus around drill string 8, and into a retention pit 24. The drilling fluid transports cuttings from the borehole into pit 24 and aids in maintaining the integrity of wellbore 16. Various materials can be used for drilling fluid, including, but not limited to, a salt-water based conductive mud.

The logging tool 10 is integrated into the bottom-hole assembly near the bit 15. In this illustrative embodiment, logging tool 10 is an LWD tool; however, in other illustrative embodiments, logging tool 10 may be utilized in a wireline or tubing-convey logging application. Logging tool 10 may be, for example, an ultra-deep reading resistivity tool. Alternatively, non-ultra-deep resistivity logging tools may also be utilized in the same drill string along with the deep reading logging tool. Illustrative logging tools include, for example, Halliburton Energy Services, Co.'s INSITE ADR™ resistivity tool or the LOGIQ ACRt™ System.

Persons ordinarily skilled in the art having the benefit of this disclosure will realize there are a variety of resistivity logging tools which may be utilized within the present disclosure. Moreover, in certain illustrative embodiments, logging tool 10 may be adapted to perform logging operations in both open and cased hole environments. Furthermore, in certain embodiments, the measurement signals utilized in the calibration process may have originated from different boreholes, preferably in the same region of earth where a strong relationship exists between the boreholes.

Still referring to FIG. 2A, as drill bit 15 extends wellbore 17 through formations 19, logging tool 10 collects measurement signals relating to various formation properties, as well as the tool orientation and various other drilling conditions. In certain embodiments, logging tool 10 may take the form of a drill collar, i.e., a thick-walled tubular that provides weight and rigidity to aid the drilling process. However, as described herein, logging tool 10 includes an induction or propagation resistivity tool to sense geology and resistivity of formations. A telemetry sub 28 may be included to transfer images and measurement data/signals to a surface receiver 30 and to receive commands from the surface. In some embodiments, telemetry sub 28 does not communicate with the surface, but rather stores logging data for later retrieval at the surface when the logging assembly is recovered.

Still referring to FIG. 2A, logging tool 10 includes a system control center ("SCC"), along with necessary processing/storage/communication circuitry, that is communicably coupled to one or more sensors (not shown) utilized to acquire formation measurement signals reflecting formation parameters. In certain embodiments, once the measurement signals are acquired, the SCC calibrates the measurement signals and communicates the data back uphole and/or to other assembly components via telemetry sub 28. In an alternate embodiment, the system control center may be located at a remote location away from logging tool 10, such as the surface or in a different borehole, and performs the processing accordingly. These and other variations within the present disclosure will be readily apparent to those ordinarily skilled in the art having the benefit of this disclosure.

The logging sensors utilized along logging tool 10 are resistivity sensors, such as, for example, magnetic or electric sensors, and may communicate in real-time. Illustrative magnetic sensors may include coil windings and solenoid windings that utilize induction phenomenon to sense conductivity of the earth formations. Illustrative electric sensors may include electrodes, linear wire antennas or toroidal antennas that utilize Ohm's law to perform the measurement. In addition, the sensors may be realizations of dipoles with a azimuthal moment direction and directionality, such as tilted coil antennas. In addition, the logging sensors may be adapted to perform logging operations in the up-hole or downhole directions. Telemetry sub 28 communicates with a remote location (surface, for example) using, for example, acoustic, pressure pulse, or electromagnetic methodologies, as will be understood by those ordinarily skilled in the art having the benefit of this disclosure.

As described above, logging tool 10 is, in this example, a deep sensing induction or propagation resistivity tool. As will be understood by those ordinarily skilled in the art having the benefit of this disclosure, such tools typically include transmitter and receiver coils that are axially separated along the wellbore. The transmitter coils generate alternating displacement currents in the formation that are a function of conductivity. The alternating currents generate voltage at the receiver coil. In addition to the path through the formation, a direct path from the transmitter to receiver also exists. In induction tools, signal from such path can be eliminated by the use of an oppositely wound and axially offset "bucking" coil. In propagation tools, phase and amplitude of the complex-valued voltage can be measured at certain operating frequencies. In such tools, it is also possible to measure phase difference and amplitude ratio between two axially spaced receivers. The phases, phase differences, amplitudes or amplitude ratios can all be calculated from complex-valued voltage measurements at the receivers. Furthermore, pulse-excitation and time-domain measurement signals can be used in the place of frequency domain measurement signals. Such measurement signals can be transformed into frequency measurements by utilizing a Fourier transform. The calibration methods described below are applicable to all of these signals and no limitation is intended with the presented examples. Generally speaking, a greater depth of investigation can be achieved using a larger transmitter-receiver pair spacing, but the vertical resolution of the measurement signals may suffer. Accordingly, logging tool 10 may employ multiple sets of transmitters or receivers at different positions along the wellbore to enable multiple depths of investigation without unduly sacrificing vertical resolution.

FIG. 2B illustrates an alternative embodiment of the present invention whereby a surface calibrated wireline logging obtains and calibrates measurement signals. At various times during the drilling process, drill string 8 may be removed from the borehole as shown in FIG. 2B. Once drill string 8 has been removed, logging operations can be conducted using a wireline logging sonde 34, i.e., a probe suspended by a cable 41 having conductors for transporting power to the sonde 34 and telemetry from sonde 34 to the surface. The wireline logging sonde 34 includes the logging tool 10 and may have pads and/or centralizing springs to maintain the tool near the axis of wellbore 17 as the tool 10 is pulled uphole. Logging sonde 34 can include a variety of sensors including a multi-array laterolog tool for measuring formation resistivity. A logging facility 43 collects measurements from the logging sonde 34, and includes a computer system 45 for processing and storing the measurements gathered by the sensors.

Figure 2C:
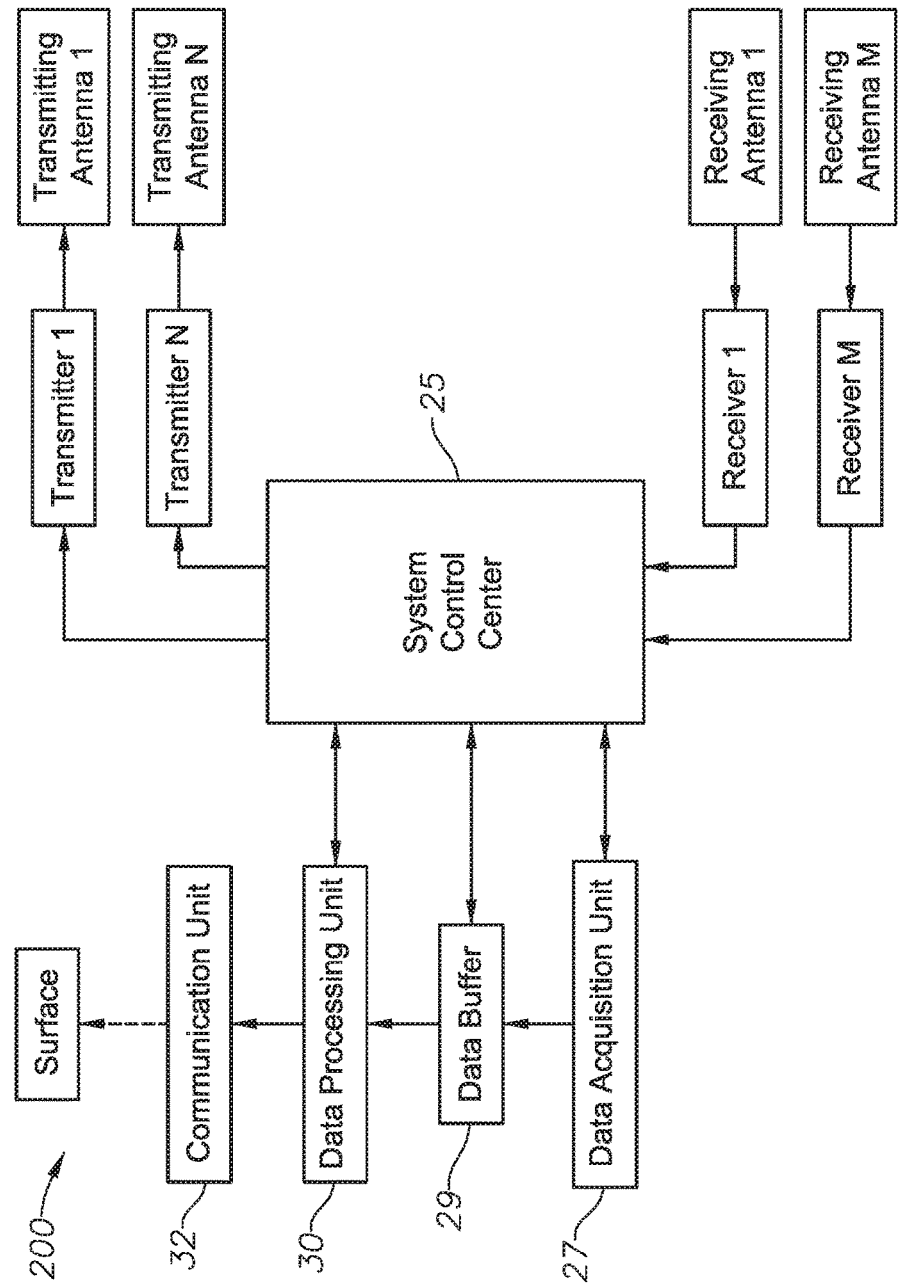
FIG. 2C shows a block diagram of circuitry embodied within a logging tool necessary to acquire the formation measurement signals, according to certain illustrative embodiments of the present disclosure.

FIG. 2C shows a block diagram of circuitry 200 embodied within logging tool 10 (or other logging tools described herein such as, for example, sonde 34) necessary to acquire the formation measurement signals, according to certain illustrative embodiments of the present disclosure. Logging tool 10 is comprised of one or more transmitters T1 . . . TN and receivers R1 . . . RN, and associated antennas, placed within grooves along logging tool 10, which may comprise, for example, magnetic dipole realizations such as coiled, tilted coil, solenoid, etc. During logging operations, pulsed or steady-state signals are generated at the transmitting antennas which interact with the formation and layer boundaries in the vicinity of logging tool 10 to produce electrical signals (i.e., measurement signals) that are picked up by the receivers. Utilizing data acquisition unit 27, system control center 25 then collects and calibrates the formation measurement signal using the methodologies described herein. Thereafter, system control center 25 records the measurement signal data to buffer 29, applies data pre-processing (using data processing unit 30) for reducing the bandwidth requirement, and then communicates the data to a remote location (surface, for example) using communication units 32 (telemetry sub 28, for example). As previously described, however, the uncalibrated formation measurement signals may be transmitted to a remote location where the calibration is then conducted. Calibration of the formation measurement signals may be conducted remotely. However, in those embodiments in which the calibration is conducted by logging tool 10, tool response times may be improved and telemetry bandwidth to other tools in the bottom hole assembly may be increased.

Although not shown in FIG. 2C, circuitry 200 includes at least one processor embodied within system control center 25 and a non-transitory and computer-readable storage, all interconnected via a system bus. Software instructions executable by the processor for implementing the illustrative calibration methodologies described herein in may be stored in local storage or some other computer-readable medium. It will also be recognized that the calibration software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

System control center 25 may further be equipped with earth modeling capability in order to provide and/or transmit subsurface stratigraphic visualizations including, for example, geo science interpretation, petroleum system modeling, geochemical analysis, stratigraphic gridding, facies, net cell volume, and petrophysical property modeling. In addition, such earth modeling capability may model well traces, perforation intervals, as well as cross-sectional through the facies and porosity data. Illustrative earth modeling platforms include, for example, DecisionSpace®, as well as its PerfWizard® functionality, which is commercially available through Landmark Graphics Corporation of Houston, Tex. However, those ordinarily skilled in the art having the benefit of this disclosure realize a variety of other earth modeling platforms may also be utilized with the present disclosure.

Figure 3A:
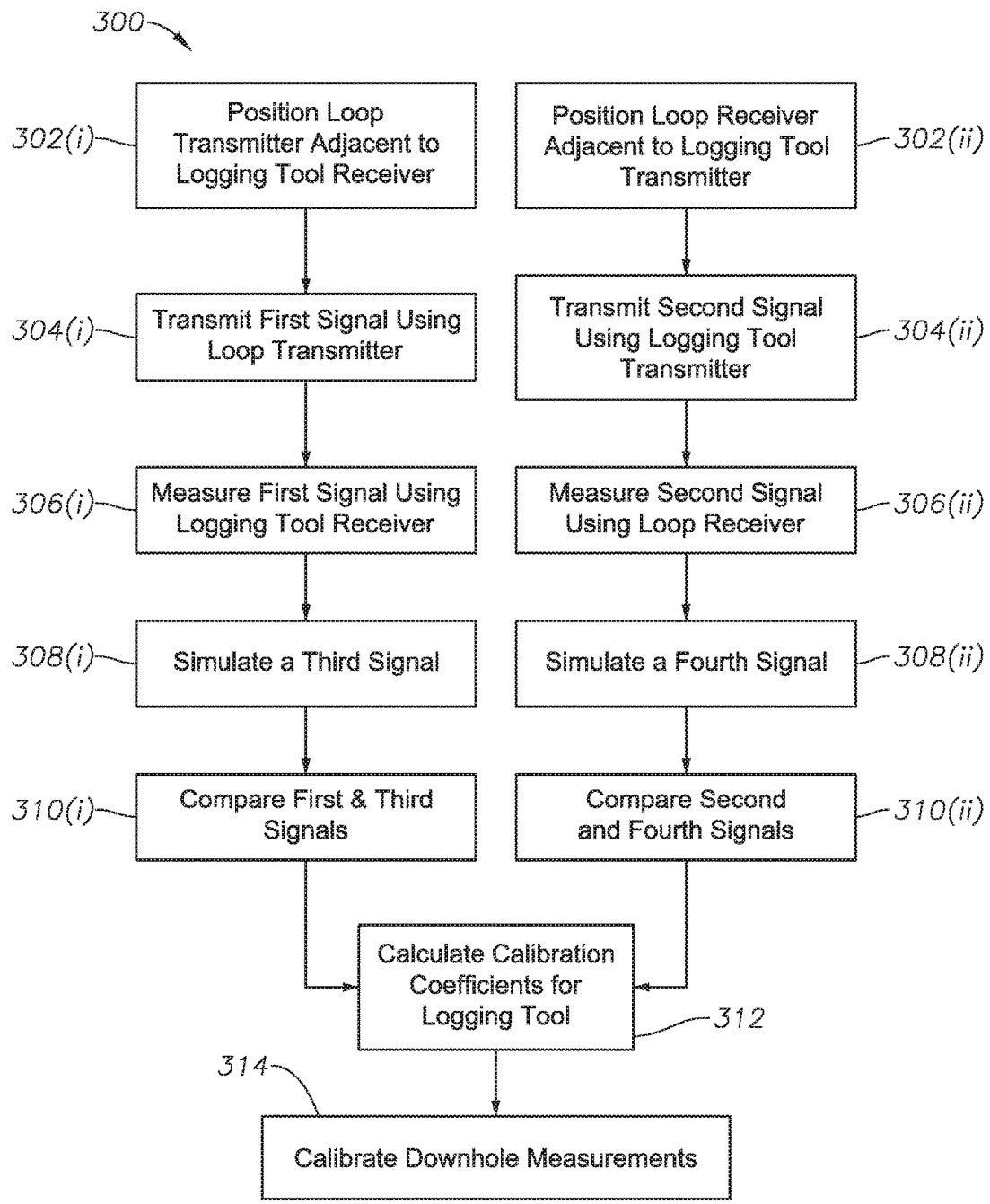
FIG. 3A is a flow chart detailing a surface calibration method according to certain illustrative methodologies of the present disclosure.

FIG. 3A is a flow chart detailing a surface calibration method 300 according to certain illustrative methodologies of the present disclosure. Method 300 is a generalized methodology of the more detailed methodologies described later. At block 302(i), a loop transmitter is positioned adjacent to the receiver logging tool such as, for example, as shown in FIG. 1. At block 302(ii), a loop receiver is positioned adjacent to the logging tool transmitter. In certain illustrative embodiments, the loop transmitter is separate from the loop receiver. As will be understood by those ordinarily skilled in the art having the benefit of this disclosure, the loop transmitter/receivers and tool transmitters/receivers described herein are coupled to circuitry that provides excitation signals and/or data acquisition ability necessary to conduct the calibration techniques. For purposes of the following description, such circuitry will be referred to as the system control center ("SCC") 25.

At block 304(*i*), SCC 25 excites the transmitter loop to transmit a first signal. At block 304(*ii*), SCC 25 excites the logging tool transmitter to transmit a second signal. At block 306(*i*), the first signal is measured by the logging tool receiver. At block 306(*ii*), the second signal is measured by the loop receiver. The loop transmitter is calibrated by utilizing a stable and known receiver, and loop receiver is calibrated by utilizing a stable and known source. The loop transmitter and loop receiver circuitry may be designed to be very stable references since they are at the surface and they don't have to operate at harsh environments, and they can preserve their stability for an extended period of time. At block 308(*i*), SCC 25 simulates (or models) a third signal, while at block 308(*ii*), SCC 25 simulates a fourth signal. The simulations are conducted using parameters of the environment in which the calibration setup is deployed, which is usually a workshop at the surface. Since the distance between the transmitters and receivers are small, sensitivity range of the measurements are small, which means details of the environment such as walls of the workshop, nearby benches, do not need to be included in the model.

At block 310(*i*), SCC 25 compares the measured first signal with the simulated third signal. At block 310(*ii*), SCC 25 compares the measured second signal with the simulated fourth signal. At block 312, SCC 25 then calculates the calibration coefficients for the logging tool based upon the comparisons of blocks 310(*i*) and 310(*ii*). To achieve this, SCC 25 utilizes one of the illustrative calibration techniques described below to calculate the calibration coefficients. Thereafter, at block 314, SCC 25 utilizes the calibration coefficients to calibrate the logging tool and/or obtained measurements.

In certain illustrative methodologies, at block 312, SCC 25 calculates the calibration coefficients for the logging tool receiver and the logging tool transmitter separately. Here, SCC 25 calculates the calibration coefficients for the logging tool receiver based upon the comparison of the measured first signal and the simulated third signal. In addition at block 312, SCC calculates the calibration coefficients for the logging tool transmitter based upon the comparison of the measured second signal and the simulated fourth signal.

Referring back to block 314, in certain illustrative embodiments, calibrating the logging tool further includes deploying the logging tool downhole and obtaining a fifth signal (or measurement) representative of a real formation characteristic using the logging tool receiver. Thereafter, the fifth signal is calibrated using the calibration coefficients calculated in block 312. Here, in one example, the calibration coefficients of the logging tool transmitter and receiver are combined in order to calibrate the fifth signal.

The calibrated fifth signal is then then inverted to produce desired formation parameters which are mainly related to electrical or geological properties of the formation, such as layer resistivities, distances, direction to layers. Illustrative inversion techniques employed may include, for example, pattern matching or iterative methods utilizing look-up tables or numerical optimization based on forward modeling, as will be understood by those ordinarily skilled in the art having the benefit of this disclosure. Illustrative formation parameters may include, for example, layer resistivities, layer positions, layer boundary shapes, 3D resistivity distribution, dip angle, strike angle, borehole radius, borehole resistivity, eccentricity or eccentricity azimuth. Moreover, in certain illustrative embodiments, SCC 25 may also output the calibrated fifth signal(s) in a variety of forms such as, for example, simply transmitting the data to a remote location (surface, for example) or outputting the data in a report or geological model.

Thereafter, a variety of wellbore operations may be performed based upon the formation data. For example, drilling decisions such as landing, geosteering, well placement or geostopping decisions may be performed. In the case of landing, as the bottom hole assembly drilling the well approaches the reservoir from above, the reservoir boundaries are detected ahead of time, thus providing the ability to steer the wellbore into the reservoir without overshoot. In the case of well placement, the wellbore may be kept inside the reservoir at the optimum position, preferably closer to the top of the reservoir to maximize production. In the case of geostopping, drilling may be stopped before penetrating a possibly dangerous zone.

The foregoing method 300 embodies a general overview of the illustrative methodologies of the present disclosure. Below, more detailed alternative methodologies of the present disclosure will be described.

Figure 3B:
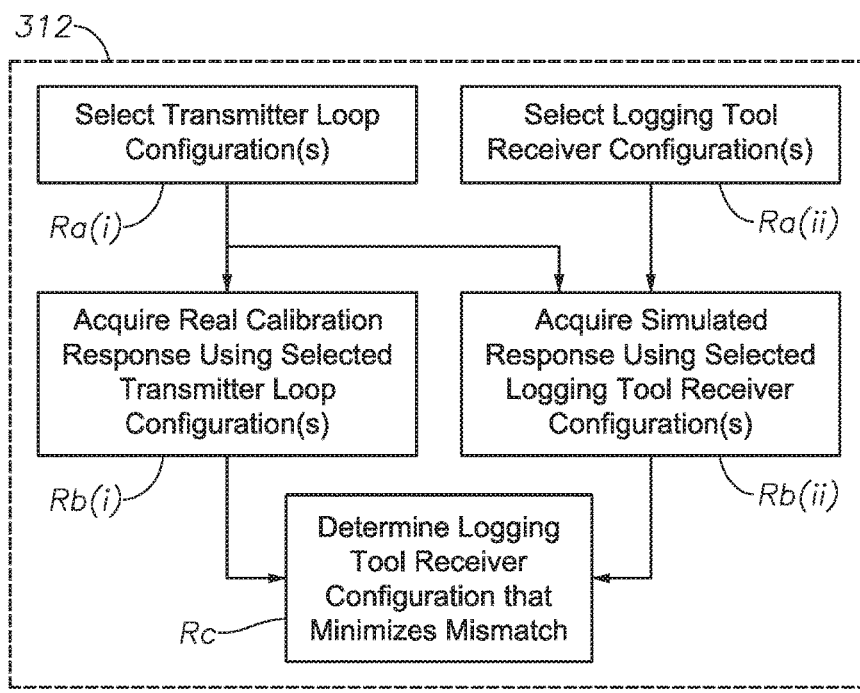
FIG. 3B is a flow chart detailing a surface calibration methodology utilized at block 312 of method 300 to calculate receiver coefficients, according to one or more alternative illustrative methodologies of the present disclosure.

FIG. 3B is a flow chart detailing a surface calibration methodology utilized at block 312 of method 300 to calculate receiver coefficients, according to one or more alternative illustrative methodologies of the present disclosure. As described above, calibration coefficients may be separately calculated for the logging tool receiver and transmitter. In one such methodology, calculating the calibration coefficients for the logging tool receiver are detailed beginning at block Ra(i), wherein, via a user interface, SCC 25 is instructed to select one or more transmitter loop configuration(s) represented by:

$$L_i = [LP_i, LT_i, LA_i]$$  Eq. (1), where $LP_i$ are the transmitter loop positions along the logging tool, $LT_i$ are the transmitter loop tilt angles, and $LA_i$ are the transmitter loop azimuth angles. Here, there are at least two reasons why multiple transmitter loop configurations may be utilized: (i) to allow for enough number of measurements to solve for all unknown receiver configuration parameters; and (ii) to optimize sensitivity to receiver configuration parameters (one particular measurement may have sensitivity to one parameter, but not necessarily others). Note, as described above in method 300, the measured first signal is obtained using the selected transmitter loop configuration(s). It is noted here that some additional loop configuration parameters may also be included, such as, for example, loop eccentricity distance and loop eccentricity direction, which describe how the loop is eccentered with respect to the tool. In addition, more parameters may be required for a non-circular or elliptical loop. For simplicity, the discussion below will be made based on the three selected parameters. However, the discussion below is also applicable to any set of loop parameters that may be utilized.

At block Rb(i), through activation of the selected logging tool receiver, SCC 25 acquires a real calibration response using the selected transmitter loop configuration(s). The resulting real calibration response of the loop transmitter to receiver may be represented by:

$$X_i = \text{REAL\_LR}(L_i, R_j)$$  Eq. (2).

At block Ra(ii), SCC 25 is again instructed, via a user interface, to select one or more logging tool receiver configuration(s) $R_j = [RC_j, RP_j, RT_j, RA_j]$, where $RC_j$ is the receiver complex gain, $RP_j$ are the receiver positions along the logging tool, $RT_j$ are the receiver tilt angles, and $RA_j$ are the receiver azimuth angles. Here, an initial guess on receiver configurations may be made. Since receivers are built based on an ideal intended design, a good initial guess is typically available. Note also, as described above in method 300, the third signal is simulated using the selected receiver configuration(s).

At block Rb(ii), SCC 25 simulates the selected transmitter loop configuration(s) of block Ra(i) with the selected logging tool receiver configurations of block Ra(ii), SCC acquires a simulated response represented by:

$$M_i = \text{MODEL\_LR}(L_i, R_j) \quad \text{Eq. (3),}$$

which is the analytical ideal response model of the receiver to the transmitter loop. Thereafter, at block Rc, SCC 25 determines the logging tool receiver configuration that minimizes the mismatch between the real (i.e., measured first signal) and simulated (i.e., simulated third signal) responses. The mismatch may be defined as the summed squared difference of the signals, or as the summed absolute value of the difference in the signals, as would be understood by those ordinarily skilled in the art having the benefit of this disclosure. Therefore, the receiver configuration that minimizes the mismatch may be represented by:

$$R_{js|n} = \text{argmin}(\text{sum}|X_i - M_i|) \quad \text{Eq. (4).}$$

SCC 25 then utilizes the determined logging tool receiver configuration(s) as the receiver calibration coefficients. Here, more specifically, based on a comparison between real measurements acquired using the selected transmitter loop configurations and the logging tool receiver and the resulting simulation, logging tool receiver configuration parameters are inverted and obtained through an inversion process. There are a variety of inversion techniques which may be utilized, as will be understood by those ordinarily skilled in the art having the benefit of this disclosure. As an example variation, different weights may be used in the sum in Eq 4 for different terms.

Figure 3C:
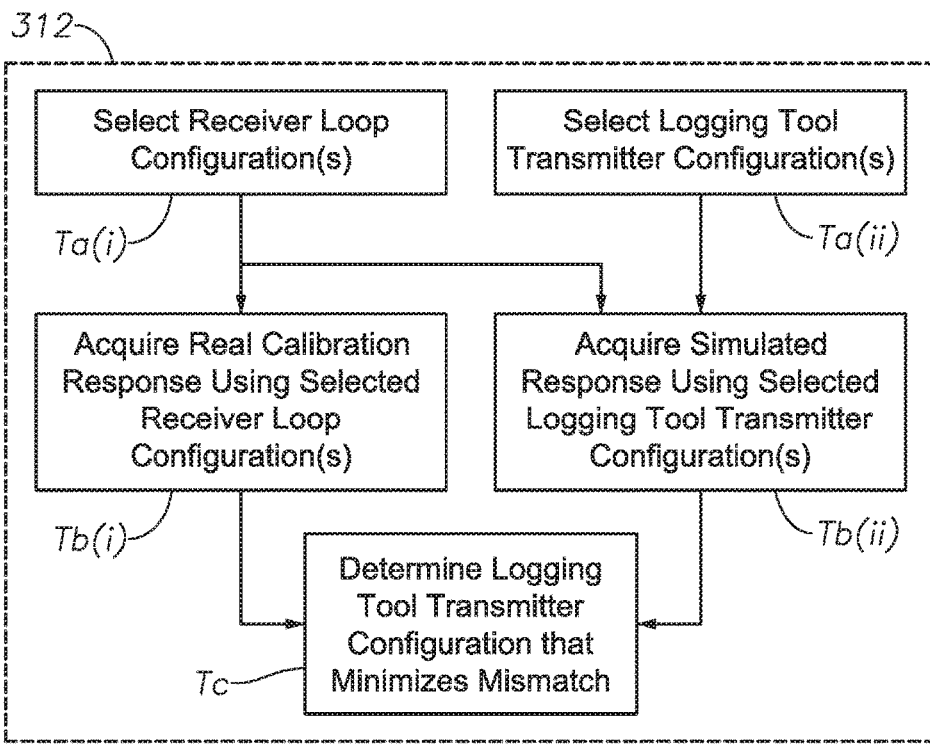
FIG. 3C is a flow chart detailing a surface calibration methodology utilized at block 312 of method 300 to calculate transmitter coefficients, according to one or more alternative illustrative methodologies of the present disclosure.

FIG. 3C is a flow chart detailing a surface calibration methodology utilized at block 312 of method 300 to calculate transmitter coefficients, according to one or more alternative illustrative methodologies of the present disclosure. As detailed below, the transmitter calibration method is analogous to the receiver calibration method of FIG. 3B. At block Ta(i), wherein, via a user interface, SCC 25 is instructed to select one or more receiver loop configuration(s) represented by:

$$L_i = [LP_i, LT_i, LA_i] \quad \text{Eq. (5),}$$

where $LP_i$ are the receiver loop positions along the logging tool, $LT_i$ are the receiver loop tilt angles, and $LA_i$ are the receiver loop azimuth angles. Thus, as described above in method 300, the measured second signal is obtained using the selected receiver loop configuration(s). It is noted here that some additional loop configuration parameters may also be included, such as, for example, loop eccentricity distance and loop eccentricity direction, which describe how the loop is eccentered with respect to the tool. In addition, more parameters may be required for a non-circular or elliptical loop. For simplicity, the discussion below will be made based on the three selected parameters. However, the discussion below is also applicable to any set of loop parameters that may be utilized.

At block Tb(i), through activation of the selected receiver loop configuration(s), SCC 25 acquires a real calibration response using the logging tool transmitter. The resulting real calibration response $X_i$ of the transmitter to receiver loop may be represented by:

$$X_i = \text{REAL\_TL}(L_i, T_j) \quad \text{Eq. (6).}$$

At block Ta(ii), SCC 25 is again instructed, via a user interface, to select one or more logging tool transmitter configuration(s) $T_j = [TC_j, TP_j, TT_j, TA_j]$, where $TC_j$ is the transmitter complex gain, $TP_j$ are the transmitter positions along the logging tool, $TT_j$ are the transmitter tilt angles, and $TA_j$ are the transmitter azimuth angles. Here, an initial guess on transmitter configurations may be made. Since transmitters are built based on an ideal intended design, a good initial guess is typically available. Note also, as described above in method 300, the fourth signal is simulated using the selected receiver configuration(s).

At block Tb(ii), SCC 25 simulates the selected receiver loop configuration(s) of block Ta(i) with the selected logging tool transmitter configurations of block Ta(ii), SCC acquires a simulated response $M_i$ represented by:

$$M_i = \text{MODEL\_TL}(L_i, T_j) \quad \text{Eq. (7),}$$

which is the analytical ideal response model of the transmitter to the receiver loop. Thereafter, at block Tc, SCC 25 determines the logging tool transmitter configuration that minimizes the mismatch between the real $X_i$ (i.e., measured second signal) and simulated $M_i$ (i.e., simulated fourth signal) responses as represented by:

$$T_{js|n} = \text{argmin}(\text{sum}|X_i - M_i|) \quad \text{Eq. (8).}$$

SCC 25 then utilizes the determined logging tool transmitter configuration(s) as the transmitter calibration coefficients. Here, based on a comparison between real measurements acquired using the selected receiver loop configurations and the logging tool transmitter and the resulting simulation, logging tool transmitter configuration parameters are inverted and obtained through an inversion process.

In certain illustrative embodiments, after the calibration coefficients for both the logging tool transmitter and receiver are obtained by SCC 25, they can be stored within the logging tool circuitry itself or at a remote location such as the surface. Thereafter, the calibration coefficients are applied as described below.

Figure 4:
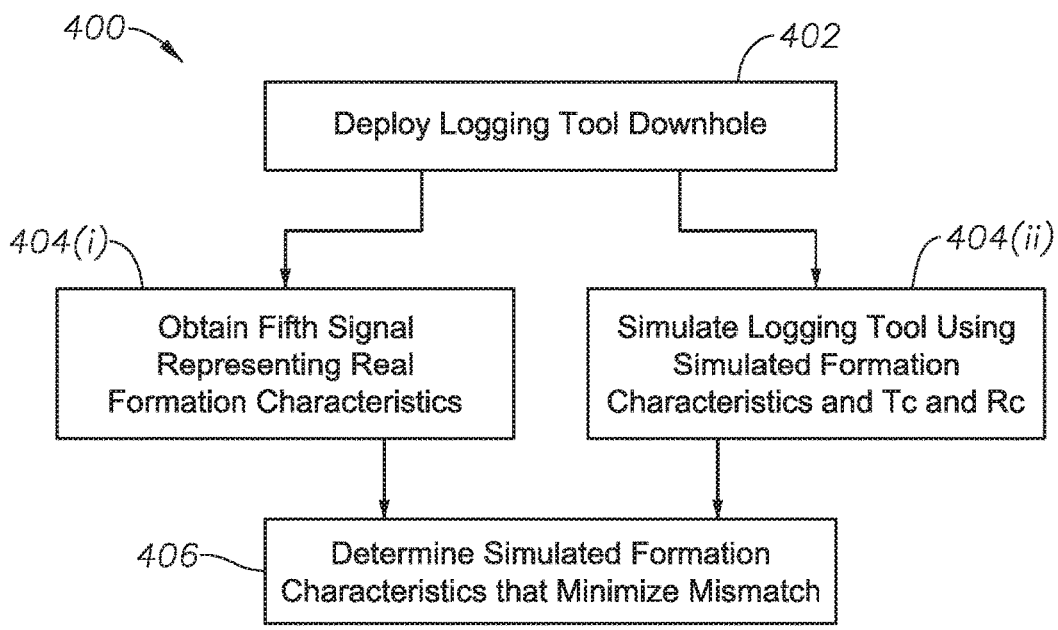
FIG. 4 is a flow chart of a method detailing application of the calibration coefficients to modeling, according to one or more illustrative methodologies of the present disclosure.

FIG. 4 is a flow chart of a method 400 detailing application of the calibration coefficients to modeling, according to one or more illustrative methodologies of the present disclosure. After the logging tool has been calibrated (i.e., the calibration coefficients obtained), the logging tool is deployed downhole along a formation at block 402. At block 404(*i*), SCC 25 then activates the tool and obtains a fifth signal representing one or more real formation characteristics F of the surrounding formation. At block 404(*ii*), SCC 25 simulates the logging tool using simulated formation characteristics P and the transmitter and receiver configurations determined at block 312 (Tc,Rc) above to thereby obtain a simulated sixth signal. Here, the simulated sixth signal may be represented as:

$$S = \text{MODEL\_DOWNHOLE}(P, T_{js|n}, R_{js|n}) \quad \text{Eq. (9).}$$

At block 406, SCC 25 then iteratively determines the simulated formation parameters P that minimize the mismatch between the real F (i.e., fifth signal) and simulated S (i.e., simulated sixth signal), as represented by:

$$P_{s|n} = \text{argmin}(\text{sum}|F - S|) \quad \text{Eq. (10).}$$

Finally, SCC 25 obtains the simulated parameters as a result of inversion. Thus, method 400 describes application of the calibration coefficients to modeling, as opposed to application of the calibration coefficients to actual measurements (as will be described in FIG. 5). Method 400 is simple and efficient in application to allow for correction of the inversion outputs. As described below, the methodology of FIG. 5 allows for correction of the real measurements.

Figure 5:
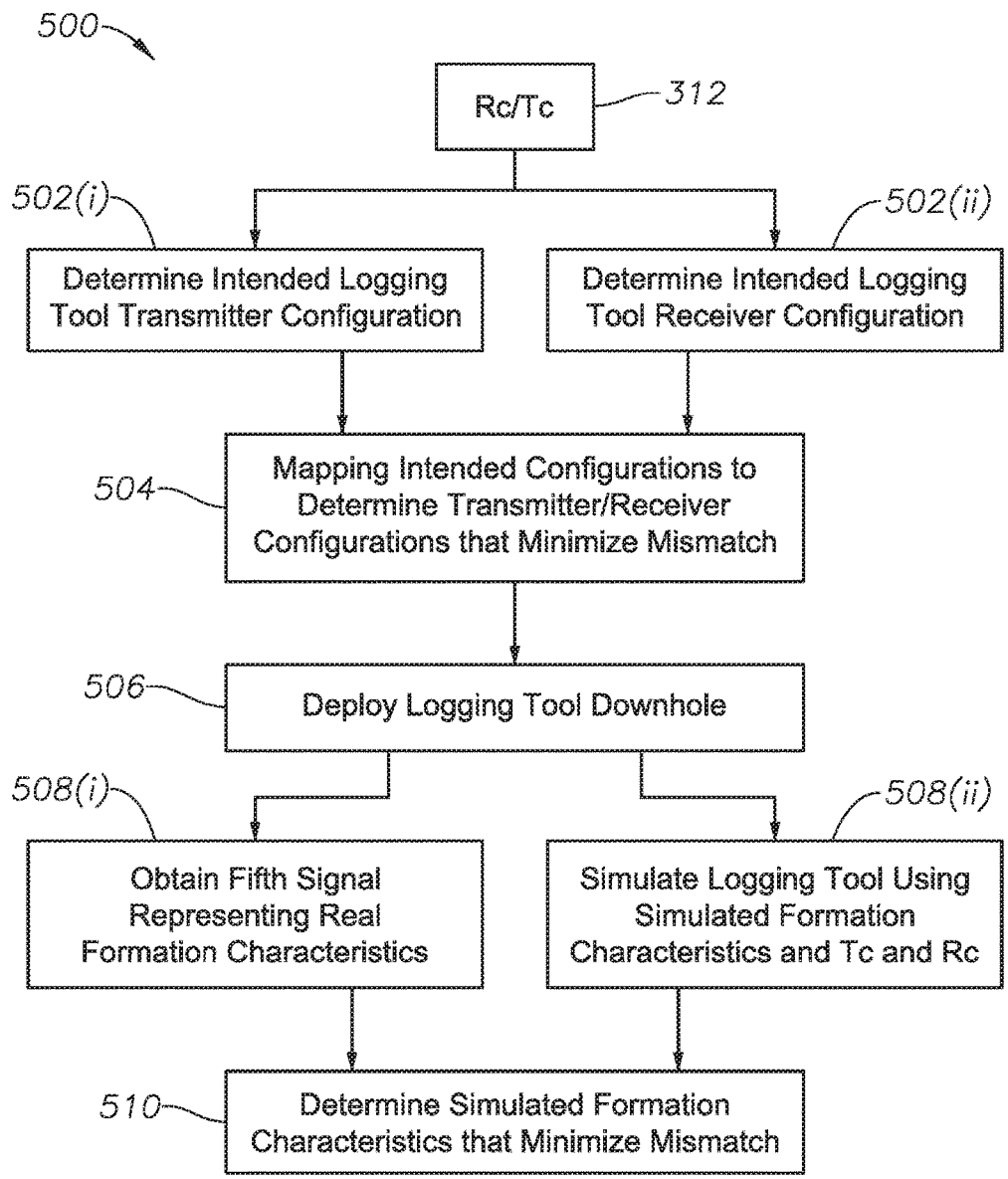
FIG. 5 is a flow chart of a method detailing application of the calibration coefficients to real measurements, according to one or more alternative illustrative methodologies of the present disclosure.

FIG. 5 is a flow chart of a method 500 detailing application of the calibration coefficients to real measurements, according to one or more alternative illustrative methodologies of the present disclosure. After the logging tool receiver and transmitter calibration coefficients of block 312 have been obtained, SCC 25 determines (e.g., uploads) the intended logging tool transmitter and receiver configurations at blocks 502(i) and 502(ii), respectively. The intended configurations are the known ideal configurations that were targeting during fabrication. Here, the intended transmitter configurations are represented by:

$$IT_j=[ITC_j, ITP_j, ITT_j, ITA_j,], \quad \text{Eq. (11)},$$

where $IT_j$ is the transmitter gain, $ITP_j$ are the transmitter positions along the tool, $ITT_j$ are the transmitter tilt angles, and $ITA_j$ are the transmitter azimuth angles. The intended receiver configurations are represented by:

$$IR_j=[IRC_j, IRC_j, IRT_j, IRA_j], \quad \text{Eq. (12)},$$

where $IRC_j$ is the receiver gain, $IRP_j$ are the receiver positions, $IRT_j$ are the receiver tilt angles, and $IRA_j$ are the receiver azimuth angles. As mentioned for the loop configuration parameters above, the number of parameters that are used for the logging tool transmitter and receiver parameters can also be varied. The discussion below is made for the above set of parameters, however it could be extended to any other set of parameters. As an example, the number of parameters can be reduced by removing those parameters that are believed to not vary as much as others based on the particular mechanical design of the tool.

At block 504, SCC 25 maps the intended transmitter and receiver configurations to the transmitter and receiver configurations (Tc,Rc) determined at block 312. The MAP may be represented as:

MAP(MODEL_DOWNHOLE
$(P,T_{js|n},R_{js|n})$)=MODEL_DOWNHOLE$(P,IT_j,IR_j)$ Eq. (13).

Here, a SCC 25 computes a correction mapping MAP that takes the real measurements and maps them to the intended measurements. Ultimately, this map is used to correct the real formation measurements before they are used in the inversion. Thereafter, at block 506, the logging tool is deployed downhole. At block 508(i), SCC 25 obtains a fifth signal representing real formation characteristics F using the logging tool. At block 508(ii), SCC 25 simulates the logging tool using simulated formation characteristics P and the determined transmitter and receiver configurations Tc,Rc to thereby obtain a simulated sixth signal, as represented by:

$$S=\text{MODEL\_DOWNHOLE}(P,IT_j,IR_j) \quad \text{Eq. (14)}.$$

Finally, at block 510, SCC 25 determines the simulated formation characteristics P that minimize the mismatch between the real F (i.e., fifth signal) and simulated S (i.e., simulated sixth signal) signals as represented by:

$$P_{s|n}=\text{argmin}(\text{sum}|\text{MAP}(F)-S|) \quad \text{Eq. (15)}.$$

Accordingly, SCC 25 corrects the real formation measurements before they are utilized in the inversion.

Figure 6A:
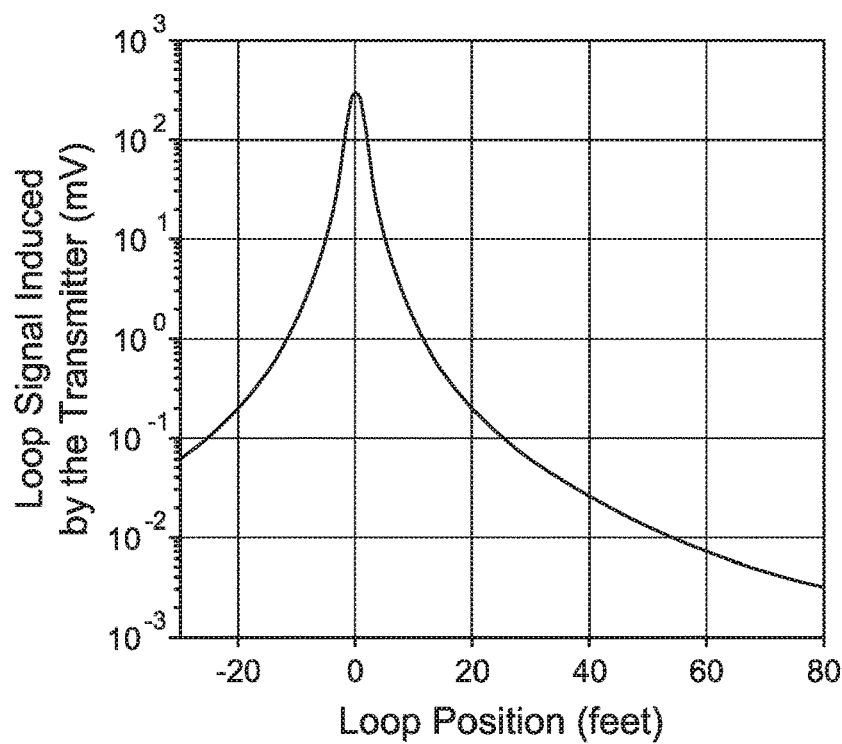
FIGS. 6A-D illustrates graphs A-D which show modeling results for the calibration methods described herein.
Figure 6B:
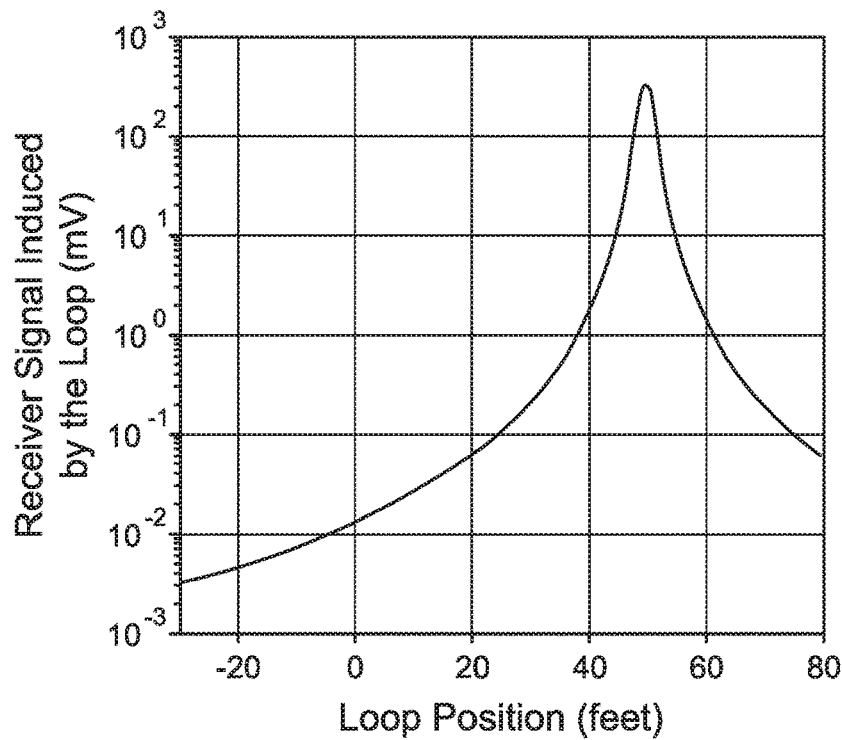
Figure 6C:
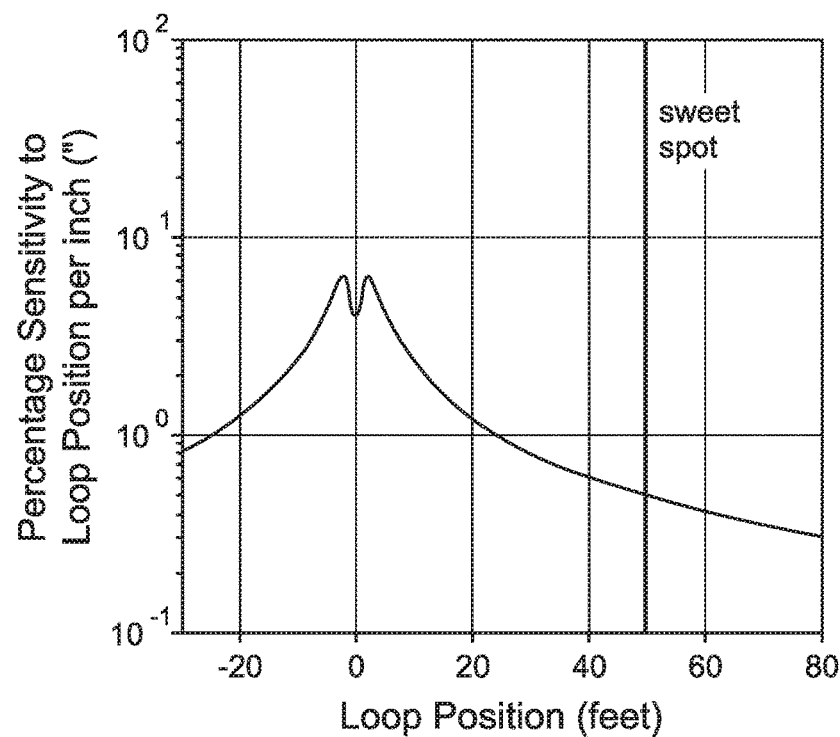
Figure 6D:
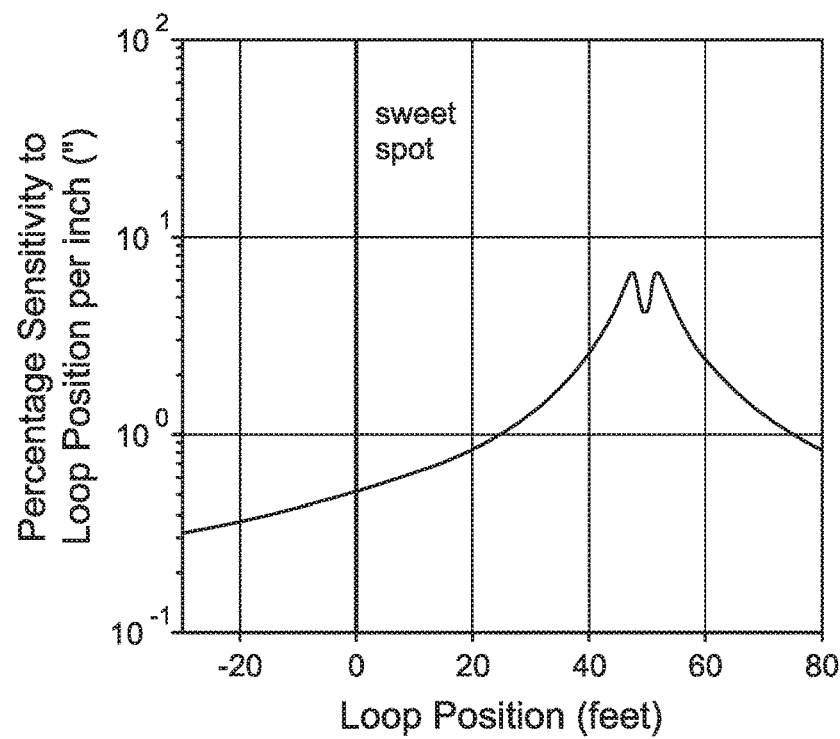

FIG. 6A-D illustrate graphs that show modeling results for the calibration methods described above. FIG. 6A shows the received signal at the loop receiver due to the tool transmitter, while FIG. 6B shows the received signal at the tool receiver due to loop transmitter. As expected, signal levels are very high and they decrease as measurements are taken from farther away. In these examples, signals are observed to be detectable at all distances considered. FIGS. 6C and 6D show the percentage change in the signal to loop position per an inch of displacement. In these examples, it can be seen that any position that is as least 10 feet away can be used to accurately calculate the calibration coefficients. At this range, less than 2% error per 1 inch of positioning error is generated. Also, as shown, the sweet spot for the measurement is about 50 feet away from the sensor provided that physical space is available. Here, to obtain the calibration coefficients, one or more points along the graphs may be compared; however, ideally, the max points at 50 feet would be utilized.

Figure 7A:
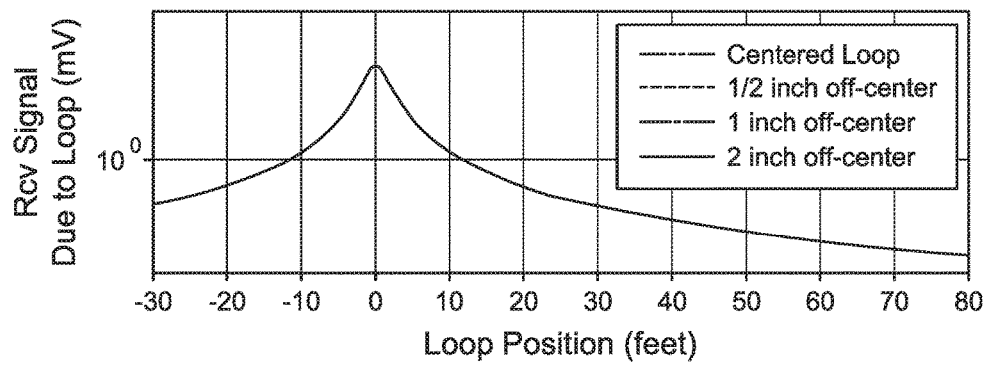
FIGS. 7A-D are graphs showing the logging tool receiver and transmitter calibration sensitivity to eccentricity effects as a function of loop position, according to certain illustrative embodiments of the present disclosure.
Figure 7B:
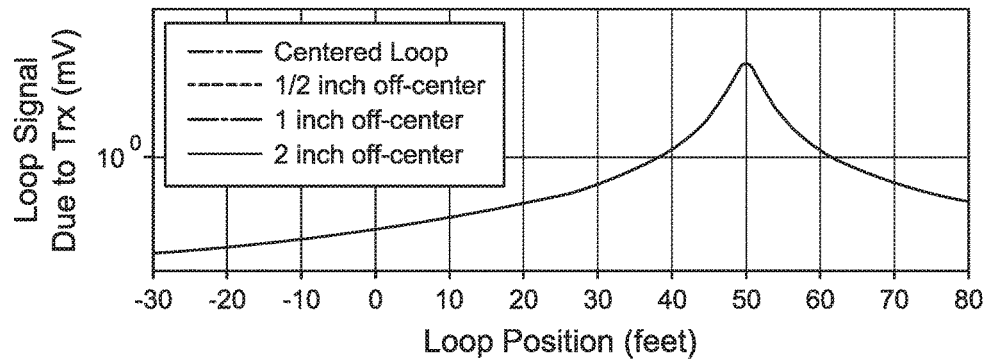
Figure 7C:
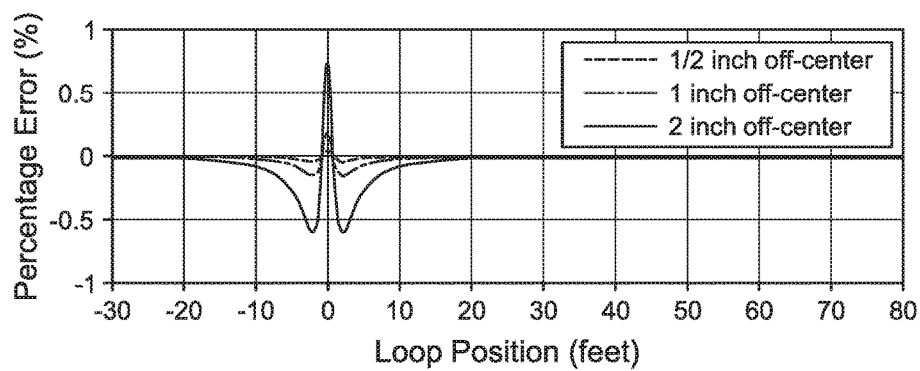
Figure 7D:
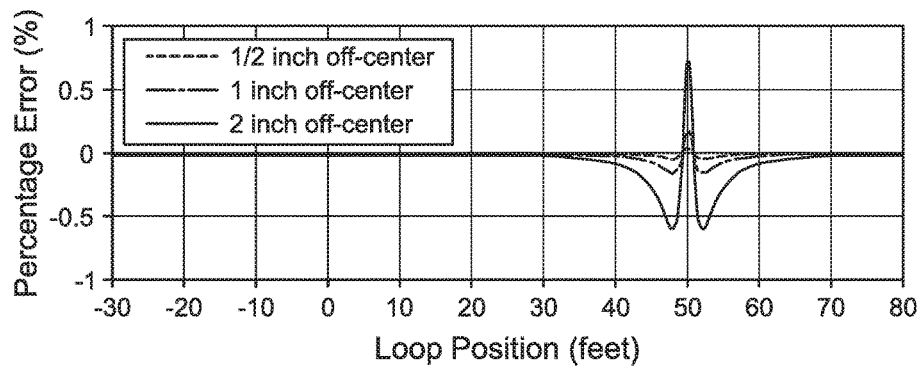

FIGS. 7A-D are graphs showing the logging tool receiver and transmitter calibration sensitivity to eccentricity (i.e., off-centering of loop) effects as a function of loop position, according to certain illustrative embodiments of the present disclosure. FIG. 7A shows the tool receiver signal induced by the transmitter loop as a function of transmitter loop position in feet, and FIG. 7C shows the respective percentage error. FIG. 7B shows the receiver loop signal induced by the tool transmitter as a function of receiver loop position in feet, and FIG. 7D shows the respective percentage error. It can be seen from FIGS. 7A-D that, even when near the transmitter or receiver positions (at z=50 and z=0 feet, respectively), deviations in loop eccentricity produces less than 0.6% change in the received signal for 2 inch off-centering. It can be concluded from these results that eccentricity does not need to be controlled precisely and included as a parameter to modeling as long as the error can be kept within 2 inch of eccentricity.

Figure 8A:
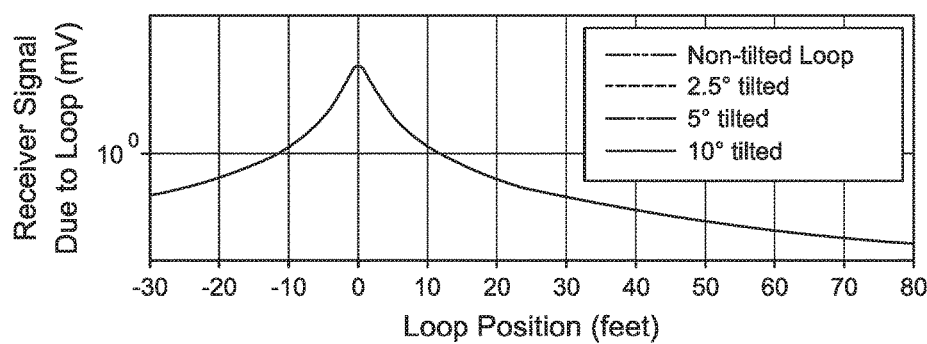
FIGS. 8A-D are graphs showing the logging tool receiver and transmitter calibration sensitivity to loop tilt angle deviation as a function of loop position, according to certain illustrative embodiments of the present disclosure.
Figure 8B:
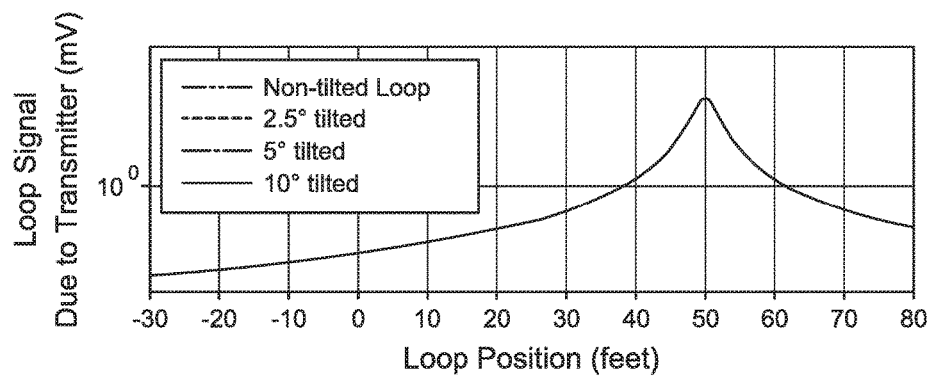
Figure 8C:
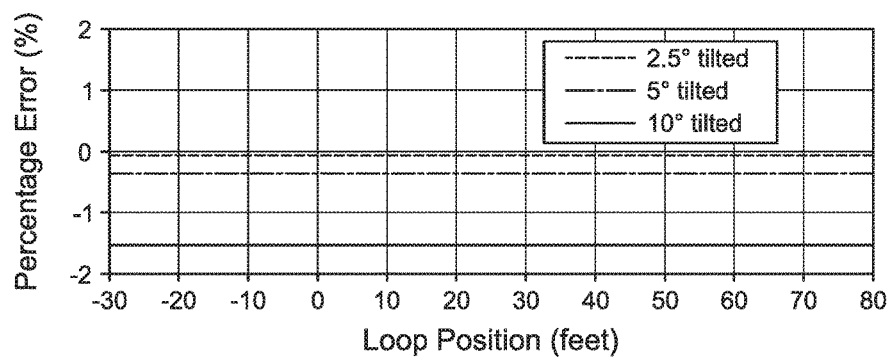
Figure 8D:
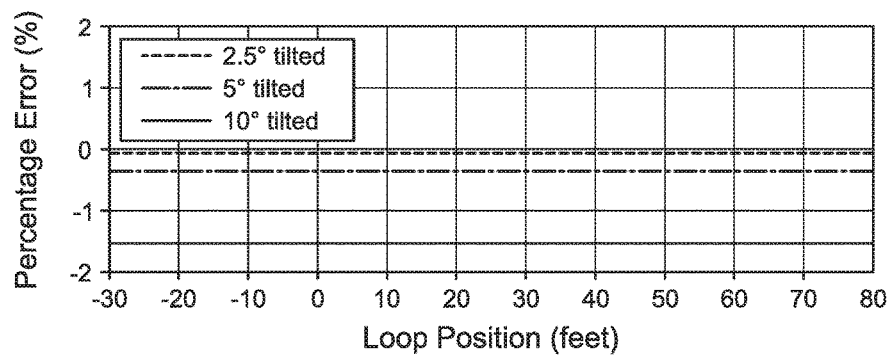

FIGS. 8A-D illustrate graphs showing the logging tool receiver and transmitter calibration sensitivity to loop tilt angle deviation as a function of loop position, according to certain illustrative embodiments of the present disclosure. FIG. 8A shows the tool receiver signal induced by the transmitter loop as a function of transmitter loop position in feet, and FIG. 8C shows the respective percentage error. FIG. 8B shows the receiver loop signal induced by the tool transmitter as a function of receiver loop position in feet, and FIG. 8D shows the respective percentage error. It can be seen from the figure that the error is same at all loop positions and it is less than 0.5% for 5 degree error in the loop tilt angle. It can be concluded from these results that tilt angle does not need to be controlled precisely and included as a parameter to modeling as long as the error can be kept within 5 degree of tilt angle.

Furthermore, with regard to calibration of the logging tool transmitter and receiver tilt angle, it should be mentioned that deep reading tools can involve tilted transmitters and tilted receivers and the signals that are received by them are very sensitive to the tilt angles and the exact geometry of the groove they are placed within. As such, the methods described herein may also be used to assist adjustment of tilt angles. In this case, measurements can be made at a multitude of positions in any of the methods described above, and the curve of the measured voltage as a function of loop/transmitter/receiver position may be acquired. This curve can then be compared to simulated curves for different tilt angles. Finally, effective tilt angle for the antenna can be found and corrected.

In certain other illustrative embodiments of the present disclosure, the methods described herein may be combined with a "heat run" whereby the logging tool is heated and measured to determine the change in tool characteristics as a function of temperature. In such embodiments, different calibration coefficients may be calculated at different temperatures and calibration may be adjusted based on temperature.

Embodiments described herein further relate to any one or more of the following paragraphs:

1. A method for surface calibration of a wellbore logging tool, the method comprising: positioning a loop transmitter adjacent to a receiver of a logging tool; positioning a loop receiver adjacent to a transmitter of the logging tool, the loop transmitter being separate from the loop receiver; transmitting a first signal using the loop transmitter; measuring the first signal using the receiver of the logging tool; transmitting a second signal using the transmitter of the logging tool; measuring the second signal using the loop receiver; simulating a third and fourth signal; comparing the measured first signal to the simulated third signal; comparing the measured second signal to the simulated fourth signal; calculating calibration coefficients for the logging tool based upon the comparison of the measured first signal and the simulated third signal and the comparison of the measured second signal and the simulated fourth signal; and calibrating the logging tool using the calibration coefficients.

2. A method as defined in paragraph 1, wherein calculating the calibration coefficients further comprises: calculating calibration coefficients for the receiver of the logging tool based upon the comparison of the measured first signal and simulated third signal; and calculating calibration coefficients for the transmitter of the logging tool based upon the comparison of the measured signal and simulated fourth signal.

3. A method as defined any of paragraphs 1-2, wherein calibrating the logging tool further comprises: deploying the logging tool downhole; obtaining a fifth signal representative of a formation characteristic using the receiver of the logging tool; and calibrating the fifth signal using the calibration coefficients.

4. A method as defined in any of paragraphs 1-3, wherein calibrating the fifth signal further comprises: combining the calibration coefficients of the transmitter with the calibration coefficients of the receiver; and utilizing the combined calibration coefficients to calibrate the fifth signal.

5. A method as defined in any of paragraphs 1-4, wherein the measured first and second signals are calibrated.

6. A method as defined in any of paragraphs 1-5, wherein calculating calibration coefficients for the receiver of the logging tool further comprises: selecting a transmitter loop configuration corresponding to at least one of: a position of the transmitter loop along the logging tool; a tilt angle of the transmitter loop; or an azimuthal angle of the transmitter loop, wherein the measured first signal is obtained using the selected transmitter loop configuration; selecting a receiver configuration corresponding to at least one of: a gain of the receiver; a position of the receiver along the logging tool; a tilt angle of the receiver; or an azimuthal angle of the receiver, wherein the third signal is simulated using the selected receiver configuration; and determining the receiver configuration that minimizes a mismatch between the measured first signal and simulated third signal, the determined receiver configuration being the calibration coefficients for the receiver.

7. A method as defined in any of paragraphs 1-6, wherein calculating calibration coefficients for the transmitter of the logging tool further comprises: selecting a receiver loop configuration corresponding to at least one of: a position of the receiver loop along the logging tool; a tilt angle of the receiver loop; or an azimuthal angle of the receiver loop, wherein the measured second signal is obtained using the selected receiver loop configuration;

selecting a transmitter configuration corresponding to at least one of: a gain of the transmitter; a position of the transmitter along the logging tool; a tilt angle of the transmitter; or an azimuthal angle of the transmitter, wherein the fourth signal is simulated using the selected transmitter configuration; and determining the transmitter configuration that minimizes a mismatch between the measured second signal and simulated fourth signal, the determined transmitter configuration being the calibration coefficients for the transmitter.

8. A method as defined in any of paragraphs 1-7, further comprising: deploying the logging tool downhole; obtaining a fifth signal representative of a real formation characteristic using the receiver of the logging tool; simulating the logging tool using simulated formation characteristics and the determined transmitter and receiver configurations that minimize the mismatches to thereby obtain a simulated sixth signal; and determining the simulated formation characteristics that minimize a mismatch between the fifth signal and the simulated sixth signal.

9. A method as defined in any of paragraphs 1-7, further comprising: determining an intended transmitter configuration for the transmitter of the logging tool, the intended transmitter configuration comprising at least one of: a gain of the transmitter; a position of the transmitter along the logging tool; a tilt angle of the transmitter; or an azimuthal angle of the transmitter; determining an intended receiver configuration for the receiver of the logging tool, the intended receiver configuration comprising at least one of: a gain of the receiver; a position of the receiver along the logging tool; a tilt angle of the receiver; or an azimuthal angle of the receiver; mapping the intended transmitter and receiver configurations to the determined transmitter and receiver configurations that minimize the mismatches; deploying the logging tool downhole; obtaining a fifth signal representative of a real formation characteristic using the receiver of the logging tool; simulating the logging tool using simulated formation characteristics and the determined transmitter and receiver configurations that minimize the mismatches to thereby obtain a simulated sixth signal; and determining the simulated formation characteristics that minimize a mismatch between the fifth signal and the simulated sixth signal.

10. A method for surface calibration of a wellbore logging tool, the method comprising: positioning a loop transmitter and a loop receiver along a logging tool at a surface location; activating a logging tool receiver and logging tool transmitter that each form part of the logging tool; transmitting signals using the loop transmitter and the logging tool transmitter; measuring the transmitted signals using the loop receiver and the logging tool receiver; comparing the measured signals with simulated signals; calculating calibration coefficients for the logging tool based upon the comparison; and calibrating the logging tool using the calibration coefficients.

11. A method as defined in paragraph 10, wherein calculating the calibration coefficients further comprises: calculating logging tool transmitter calibration coefficients based upon the comparison; and calculating logging tool receiver calibration coefficients based upon the comparison.

12. A method as defined in any of paragraphs 10-11, further comprising: deploying the logging tool downhole; obtaining a signal representative of a real formation characteristic using the logging tool; and calibrating the obtained signal using the calibration coefficients.

13. A method as defined in any of paragraphs 10-12, wherein the simulated signals are simulated using at least one of a logging tool receiver configuration or a logging tool transmitter configuration.

14. A method as defined in any of paragraphs 10-13, wherein the logging tool receiver and transmitter configurations comprise at least one of: a gain of the transmitter or receiver; a position of the transmitter or receiver along the logging tool; a tilt angle of the transmitter or receiver; or an azimuthal angle of the transmitter or receiver.

15. A method as defined in any of paragraphs 1-14, further comprising: heating the logging tool; and calculating the calibration coefficients as a function of temperature.

16. A method as defined in any of paragraphs 1-14, wherein the logging tool is a deep resistivity logging tool.

17. A method as defined in any of paragraphs 1-14, wherein the logging tool forms part of a logging while drilling or wireline assembly.

Moreover, any of the methodologies described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for surface calibration of a wellbore logging tool, the method comprising: positioning a loop transmitter adjacent to a receiver of a logging tool;
    positioning a loop receiver adjacent to a transmitter of the logging tool, the loop transmitter being separate from the loop receiver;
    transmitting a first signal using the loop transmitter;
    measuring the first signal using the receiver of the logging tool;
    transmitting a second signal using the transmitter of the logging tool;
    measuring the second signal using the loop receiver;
    simulating a third and fourth signal;
    comparing the measured first signal to the simulated third signal;
    comparing the measured second signal to the simulated fourth signal;
    calculating calibration coefficients for the logging tool based upon the comparison of the measured first signal and the simulated third signal and the comparison of the measured second signal and the simulated fourth signal; and
    calibrating the logging tool using the calibration coefficients.

2. A method as defined in claim 1, wherein calculating the calibration coefficients further comprises:
    calculating calibration coefficients for the receiver of the logging tool based upon the comparison of the measured first signal and simulated third signal; and
    calculating calibration coefficients for the transmitter of the logging tool based upon the comparison of the measured second signal and simulated fourth signal.

3. A method as defined in claim 1, wherein calibrating the logging tool further comprises:
    deploying the logging tool downhole;
    obtaining a fifth signal representative of a formation characteristic using the receiver of the logging tool; and
    calibrating the fifth signal using the calibration coefficients.

4. A method as defined in claim 3, wherein calibrating the fifth signal further comprises:
    combining the calibration coefficients of the transmitter with the calibration coefficients of the receiver; and
    utilizing the combined calibration coefficients to calibrate the fifth signal.

5. A method as defined in claim 1, wherein the measured first and second signals are calibrated.

6. A method as defined in claim 2, wherein calculating calibration coefficients for the receiver of the logging tool further comprises:
    selecting a transmitter loop configuration corresponding to at least one of:
    a position of the transmitter loop along the logging tool;
    a tilt angle of the transmitter loop; or
    an azimuthal angle of the transmitter loop, wherein the measured first signal is obtained using the selected transmitter loop configuration;
    selecting a receiver configuration corresponding to at least one of:
    a gain of the receiver;
    a position of the receiver along the logging tool;
    a tilt angle of the receiver; or
    an azimuthal angle of the receiver, wherein the third signal is simulated using the selected receiver configuration; and
    determining the receiver configuration that minimizes a mismatch between the measured first signal and simulated third signal, the determined receiver configuration being the calibration coefficients for the receiver.

7. A method as defined in claim 2, wherein calculating calibration coefficients for the transmitter of the logging tool further comprises:
    selecting a receiver loop configuration corresponding to at least one of:
    a position of the receiver loop along the logging tool;
    a tilt angle of the receiver loop; or
    an azimuthal angle of the receiver loop, wherein the measured second signal is obtained using the selected receiver loop configuration;
    selecting a transmitter configuration corresponding to at least one of:
    a gain of the transmitter;
    a position of the transmitter along the logging tool;
    a tilt angle of the transmitter; or
    an azimuthal angle of the transmitter, wherein the fourth signal is simulated using the selected transmitter configuration; and
    determining the transmitter configuration that minimizes a mismatch between the measured second signal and simulated fourth signal, the determined transmitter configuration being the calibration coefficients for the transmitter.

8. A method as defined in claim 6 or 7, further comprising:
    deploying the logging tool downhole;
    obtaining a fifth signal representative of a real formation characteristic using the receiver of the logging tool;
    simulating the logging tool using simulated formation characteristics and the determined transmitter and receiver configurations that minimize the mismatches to thereby obtain a simulated sixth signal; and determining the simulated formation characteristics that minimize a mismatch between the fifth signal and the simulated sixth signal.

9. A method as defined in claim 6 or 7, further comprising:
determining an intended transmitter configuration for the transmitter of the logging tool, the intended transmitter configuration comprising at least one of:
a gain of the transmitter;
a position of the transmitter along the logging tool;
a tilt angle of the transmitter; or
an azimuthal angle of the transmitter;
determining an intended receiver configuration for the receiver of the logging tool, the intended receiver configuration comprising at least one of:
a gain of the receiver;
a position of the receiver along the logging tool;
a tilt angle of the receiver; or
an azimuthal angle of the receiver;
mapping the intended transmitter and receiver configurations to the determined transmitter and receiver configurations that minimize the mismatches;
deploying the logging tool downhole;
obtaining a fifth signal representative of a real formation characteristic using the receiver of the logging tool;
simulating the logging tool using simulated formation characteristics and the determined transmitter and receiver configurations that minimize the mismatches to thereby obtain a simulated sixth signal; and
determining the simulated formation characteristics that minimize a mismatch between the fifth signal and the simulated sixth signal.

10. A method for surface calibration of a wellbore logging tool, the method comprising:
positioning a loop transmitter and a loop receiver along a logging tool at a surface location, wherein:
the loop transmitter and loop receiver are separate from the logging tool; and
the loop transmitter is separate from the loop receiver;
activating a logging tool receiver and logging tool transmitter that are each integrated into a body of the logging tool;
transmitting signals using the loop transmitter and the logging tool transmitter;
measuring the transmitted signals using the loop receiver and the logging tool receiver;
comparing the measured signals with simulated signals;
calculating calibration coefficients for the logging tool based upon the comparison; and
calibrating the logging tool using the calibration coefficients.

11. A method as defined in claim 10, wherein calculating the calibration coefficients further comprises:
calculating logging tool transmitter calibration coefficients based upon the comparison; and
calculating logging tool receiver calibration coefficients based upon the comparison.

12. A method as defined in claim 10, further comprising:
deploying the logging tool downhole;
obtaining a signal representative of a real formation characteristic using the logging tool; and
calibrating the obtained signal using the calibration coefficients.

13. A method as defined in claim 10, wherein the simulated signals are simulated using at least one of a logging tool receiver configuration or a logging tool transmitter configuration.

14. A method as defined in claim 13, wherein the logging tool receiver and transmitter configurations comprise at least one of:
a gain of the transmitter or receiver;
a position of the transmitter or receiver along the logging tool;
a tilt angle of the transmitter or receiver; or
an azimuthal angle of the transmitter or receiver.

15. A method as defined in claim 1, further comprising:
heating the logging tool; and
calculating the calibration coefficients as a function of temperature.

16. A method as defined in claim 1, wherein the logging tool is a deep resistivity logging tool.

17. A method as defined in claim 1, wherein the logging tool forms part of a logging while drilling or wireline assembly.

18. A system comprising processing circuitry to implement any one of the methods of claims 1-17.

19. A non-transitory computer-program product comprising instructions which, when executed by at least one processor, causes the processor to perform any one of the methods of claims 1-17.

* * * * *